United States Patent
Quenzer-Hohmuth et al.

(10) Patent No.: US 10,432,089 B2
(45) Date of Patent: Oct. 1, 2019

(54) METHOD FOR OPTIMIZING THE OPERATION OF A DIGITAL CONTROLLER PROVIDED IN A CONTROL LOOP FOR A STEP-UP CONVERTER, A CONTROL LOOP, AND A COMPUTER PROGRAM PRODUCT

(71) Applicant: Robert Bosch GmbH, Stuttgart (DE)

(72) Inventors: Samuel Quenzer-Hohmuth, Reutlingen (DE); Steffen Ritzmann, Reutlingen (DE); Thoralf Rosahl, Eningen (DE); Bernhard Wicht, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/077,521

(22) PCT Filed: Jan. 16, 2017

(86) PCT No.: PCT/EP2017/050753
§ 371 (c)(1),
(2) Date: Aug. 13, 2018

(87) PCT Pub. No.: WO2017/148605
PCT Pub. Date: Sep. 8, 2017

(65) Prior Publication Data
US 2019/0068056 A1      Feb. 28, 2019

(30) Foreign Application Priority Data

Mar. 2, 2016   (DE) .................. 10 2016 203 366

(51) Int. Cl.
*H02M 3/157*   (2006.01)
*H02M 1/42*    (2007.01)
*H02M 1/00*    (2006.01)

(52) U.S. Cl.
CPC ......... *H02M 3/157* (2013.01); *H02M 1/4225* (2013.01); *H02M 2001/0003* (2013.01);
(Continued)

(58) Field of Classification Search
CPC .................................................... H02M 3/157
See application file for complete search history.

(56) References Cited

U.S. PATENT DOCUMENTS

| | | |
|---|---|---|
| 2009/0079401 A1 | 3/2009 | Mok et al. |
| 2010/0237836 A1 | 9/2010 | Fahrenbruch et al. |

(Continued)

OTHER PUBLICATIONS

International Search Report for PCT/EP2017/050753, dated Apr. 19, 2017.
(Continued)

*Primary Examiner* — Kyle J Moody
*Assistant Examiner* — Trinh Q Dang
(74) *Attorney, Agent, or Firm* — Norton Rose Fulbright US LLP; Gerard Messina

(57) ABSTRACT

A method for optimizing the operation of a digital controller provided in a control loop for a step-up converter. The method includes: evaluating at least one output variable of the digital controller during operation of the step-up converter; estimating the instantaneous load resistance value in the path of the control loop based on the at least one evaluated output variable; setting at least one controller coefficient of the digital controller based on the estimated instantaneous load resistance value during operation of the step-up converter. A change in the setting of the at least one controller coefficient results in a change in the transition frequency in the control loop. Furthermore, a control loop for a step-up converter that includes a digital controller is provided, which is configured to carry out the steps of the method. A computer program product that includes computer-executable program code for carrying out the method.

9 Claims, 5 Drawing Sheets

(52) U.S. Cl.
CPC ............... *H02M 2001/0012* (2013.01); *H02M 2001/0025* (2013.01)

(56) References Cited

U.S. PATENT DOCUMENTS

| | | |
|---|---|---|
| 2012/0035779 A1 | 2/2012 | Latham et al. |
| 2012/0081009 A1* | 4/2012 | Shteynberg .......... H05B 33/083 315/122 |
| 2014/0009132 A1 | 1/2014 | Cao et al. |
| 2014/0266084 A1 | 9/2014 | Fan et al. |
| 2015/0091544 A1* | 4/2015 | Jayaraj .................. H02M 3/156 323/284 |

OTHER PUBLICATIONS

Sira-Ramirez H., et al., "An Algebraic Parameter Estimation Approach to the Adaptive Observer-Controller Based Regulation of the Boost Converter", Industrial Electronics, 2007. ISIE 2007. IEEE International Symposium on, IEEE , PI, Jun. 1, 2007, pp. 3367-3372, XP031156693.

Amin Hajizadeh., et al., "Self-Tuning Indirect Adaptive Control of Non-Inverting Buck-Boost Converter", In: IEEE, Published in IET Power Electronics, vol. 8, Nov. 12, 2015, Issue 11, pp. 2299-2306.—ISSN 1755-4535.

Kelly, A. Rinne, et al., "Control of DC-DC Converters by Direct Pole Placement and Adaptive Feedfoward Gain Adjustment", In: Twentieth Annual IEEE Applied Power Electronics Conference and Expostion, Mar. 2005, pp. 1970-1975.

* cited by examiner

METHOD FOR OPTIMIZING THE OPERATION OF A DIGITAL CONTROLLER PROVIDED IN A CONTROL LOOP FOR A STEP-UP CONVERTER, A CONTROL LOOP, AND A COMPUTER PROGRAM PRODUCT

The present invention relates to a method for optimizing the operation of a digital controller provided in a control loop for a step-up converter, including the following method steps: evaluating at least one output variable of the digital controller during operation of the step-up converter; estimating the instantaneous load resistance value in the path of the control loop based on the at least one evaluated output variable; and setting at least one controller coefficient of the digital controller based on the estimated instantaneous load resistance value during operation of the step-up converter.

BACKGROUND INFORMATION

Step-up converters, also referred to as boost converters, convert an input voltage $U_1$ into a higher output voltage $U_2$. They are used in many battery-powered devices in which the electronics require a voltage that is higher than the battery voltage, for example in notebooks, mobile telephones, or various household appliances. A step-up converter from the related art is shown in FIG. 1. Step-up converter 1 shown there includes an inductor L, a diode Di, a capacitor C, and a switch S which is controlled in a predetermined clock pulse.

Step-up converters are generally connected in a control loop within which and by which the operation of the step-up converter is controlled. So-called digital controllers, with the aid of which the operation of the step-up converter in the control loop may be precisely adjusted and controlled, are an important element within these control loops nowadays. The path of the control loop is modelled in designing the control loop for a step-up converter. The so-called path transmission function of a step-up converter to be determined within the scope of the modeling is a function of various parameters of the control loop. These parameters include, among others, for example the load resistance that is fed in the path of the control loop by the step-up converter, the output and input voltages, and the LC filter values of the output converter. This results in various path transmission functions for various parameter values, and for these various path transmission functions, various optimal configurations of the above-mentioned controllers. Each controller configuration results from the specific setting of various coefficients of the controller, so that two different controller configurations differ from one another in the different setting of at least one controller coefficient.

Of all the (above-mentioned) parameters whose change can affect the path transmission function of a control loop, changes in the load resistance have the greatest effects on the path transmission function of the control loop of a step-up converter. The path transmission function of a step-up converter has a so-called right-half plane zero (RHPZ) point in the pole-zero point diagram, which has adverse effects on the stability of the control loop of the step-up converter. For this reason, transition frequency $f_T$ of the control loop for controlling step-up converters in the related art is selected to be significantly below the frequency that is associatable with the right-half plane zero point. However, the frequency that is associatable with the right-half plane zero point migrates to higher frequencies with increasing load resistance, which would allow transition frequency $f_T$ of the control loop to be selected to be higher for higher load resistances than for lower load resistances, thus allowing a faster control loop to be implemented.

However, in the control loops for step-up converters of the related art, a single, largely unchangeable controller configuration is generally selected, and consequently a transition frequency $f_T$ is set which also remains constant when there is a change in the load situation in the path of the control loop. Invariable transition frequency $f_T$ which is preset in the controller by an appropriate choice of the controller coefficients is specifically selected in such a way that a worst-case condition—the presence of the smallest possible load resistance $R_L$ in the path of the control loop—is always covered. However, as a result of this procedure, transition frequency $f_T$ is constantly low, independently of load resistance $R_L$, and the control loop is therefore generally slow.

FIG. 2 graphically illustrates this relationship. In particular, FIG. 2 shows a diagram in which the frequency that is associatable in each case with a particular right-half plane zero point RHPZ at a given load resistance $R_L$ in the control loop, as well as various transit frequencies $f_{Tmax}$, $f_{Tinst}$ of the control loop of a step-up converter, are plotted in Hertz as a function of load resistance $R_L$ of the path of the control loop in ohms. The straight line denoted by reference character RHPZ in FIG. 2 thus shows the frequency that is associatable in each case with a right-half plane zero point of the control loop at a given load resistance $R_L$, and that increases with increasing load resistance $R_L$ in the path of the control loop. The straight line denoted by reference character $f_{Tmax}$ shows the maximum allowable transition frequency, at a given load resistance $R_L$, at which the control loop may be reliably, stably, and optimally operated. The constant denoted by reference character $f_{Tinst}$ shows the preset, unchangeable transition frequency in the controller according to the related art, so that the gray shaded area A in FIG. 2 depicts an unutilized potential of the control loop.

SUMMARY

According to an example embodiment of the present invention, a method is provided for optimizing the operation of a digital controller that is provided in a control loop for a step-up converter. The method includes the following method steps: evaluating at least one output variable of the digital controller during operation of the step-up converter; estimating the instantaneous load resistance value in the path of the control loop based on the at least one evaluated output variable; and setting at least one controller coefficient of the digital controller based on the estimated instantaneous load resistance value during operation of the step-up converter. According to the present invention, a change in the setting of the at least one controller coefficient results in a change in the transition frequency in the control loop.

The method according to the present invention allows the transition frequency of the control loop to be adapted to the instantaneous load situation, or to a shift in the right-half plane zero point in the pole-zero point diagram that results from a changed load situation, with the aid of an efficient method for estimating the load resistance. A much faster control loop for a step-up converter, with much better load jump behavior at large load resistances, may be implemented in this way. In contrast to the related art, within the scope of the method according to the present invention the load resistance is estimated based on the coil current, and the output variables of a digital controller that is not implemented as an analog component are evaluated, which allows the transition frequency of the control loop to be easily adapted.

The setting of at least one controller coefficient of the digital controller based on the estimated instantaneous load resistance value during operation of the step-up converter preferably corresponds to an adaptation or readjustment of at least one controller coefficient of the digital controller based on the estimated instantaneous load resistance value during operation of the step-up converter.

Setting the at least one controller coefficient preferably results in an increase in the transition frequency when the load resistance value, estimated in the step of estimating, is greater than a load resistance value previously estimated or initially taken into account. Such a method allows the implementation of a control loop with the greatest possible transition frequency for the instantaneous load resistance, which significantly increases the efficiency of the control.

In one preferred specific embodiment, setting the at least one controller coefficient results in a decrease in the transition frequency when the estimated load resistance value is less than a load resistance value previously estimated or initially taken into account. Carrying out such a method ensures that the control loop is stably operable at all times.

Setting the at least one controller coefficient preferably results in a decrease or an increase in the transition frequency ($f_T$) by a magnitude $\Delta X$, where $\Delta X \in [0\ \text{Hz};\ 20\ \text{kHz}]$. In addition, setting the at least one controller coefficient preferably results in an adaptation of the transition frequency ($f_T$) to maximum allowable transition frequency $f_{Tmax}$, where the formula relationship $$f_{Tmax} = 1/(2*pi)*\tfrac{1}{3}*R_L*(1-D)^2/L$$

applies for $f_{Tmax}$. In this formula relationship, D corresponds to the duty cycle of the controller, $R_L$ corresponds to the value of the load resistance in the path, and L corresponds to the value of the inductance of the step-up converter. In such a design of the method, for a change in load resistance value $R_L$ it is always possible to determine, and set or bring about, a corresponding change in maximum allowable transition frequency $f_{Tmax}$.

An output variable of the digital controller that is evaluated in the step of evaluating may preferably also be an output variable of the control loop or of the path of the control loop.

The controller coefficient that is set, adapted, or readjusted in the step of setting the at least one controller coefficient of the digital controller is preferably the coefficients $a_0$, $a_1$, $b_0$, and $b_1$ of the digital controller, the amplification of the controller resulting from $$DC\_gain(R_L) = K\_nom*(-1+2/5*R_L).$$

The adapted zero point of the controller preferably results from $$\omega_z(R_L) = \omega_{z,nom} + (80*(R_L-5)),$$

while the adapted pole point of the controller preferably results from $$\omega_p(R_L) = \omega_{p,nom} + (5000*(R_L-5)).$$

These parameters are preferably entered as follows in the computation of the controller transmission function D (z):

$$D(z) = DC_{gain} * \frac{\omega_p}{\omega_z} * \frac{\left(\omega_z*\frac{T}{2}+1\right)+\left(w_z*\frac{T}{2}-1\right)*z^{-1}}{\left(\omega_p*\frac{T}{2}+1\right)+\left(w_p*\frac{T}{2}-1\right)*z^{-1}} * \frac{1}{1-z^{-1}}$$

where T corresponds to the sampling time. This may be alternatively described by $$D(z) = K' * \frac{a_0 + a_a*z^{-1}}{b_0 + b_1*z^{-1}} * \frac{1}{1-z^{-1}}$$

and with $$K' = DC_{gain} * \frac{\omega_p}{\omega_z}$$

the variable controller coefficients of the controller result in $$a_0 = \left(\omega_z*\frac{T}{2}+1\right)$$

$$a_1 = \left(\omega_z*\frac{T}{2}-1\right)$$

$$b_0 = \left(\omega_p*\frac{T}{2}+1\right)$$

$$b_1 = \left(\omega_p*\frac{T}{2}-1\right)$$

The load resistance value initially taken into account is preferably a load resistance value that is preset when the step-up converter is started up or switched on.

The output voltage of the control loop or of the path, the controller output value, the duty cycle, and/or the period duration of the controller and/or the voltage of the compensation ramp of the step-up converter from peak to peak are/is preferably evaluated in the step of evaluating at least one output variable.

Such an evaluation within the scope of the method according to the present invention allows an accurate estimation of the load resistance value in the path of the control loop. An evaluation preferably corresponds to reading out the digitally stored or provided output variables of the digital controller, which therefore do not need to be measured in the step of evaluating. In addition, preferably no measurement of the at least one output variable takes place in the step of evaluating.

In the present case, the controller output value ControllerOut is preferably understood to mean the final computed value of the digital controller, which is relayed to the path as a manipulated variable.

The voltage of the compensation ramp of the step-up converter from peak to peak may preferably be ascertained from the current flow through the diode of the step-up converter during operation of same, taking into account the controller output value and the duty cycle of the controller.

The following formula relationship is preferably used for estimating the load resistance value in the step of estimating:

$$R_L = \frac{U_{out}}{(1-D)*\left(\frac{ControllerOut - U_{comp,ss}*D}{R_{shunt}} - \frac{U_{out}*(1-D)*D*T_{sw}}{2*L}\right)}$$

where $R_L$ is the value of the load resistance in the path, $U_{out}$ is the value of the output voltage of the control loop or of the path, ControllerOut is the controller output value of the controller, $U_{comp,ss}$ is the value of the voltage of the compensation ramp of the step-up converter from peak to peak, D is the duty cycle of the controller, $R_{shunt}$ is the value of a shunt resistance for measuring the coil current of the step-up converter, L is the value of the inductance of the step-up converter, and $T_{SW}$ is the period duration of the controller. All output variables of the controller that are necessary according to the above formula relationship for estimating the load resistance value are preferably evaluated in the step of evaluating. This formula relationship, derived, among other things, from the current flow through the diode during operation of the step-up converter, allows a very accurate and reliable estimation of the load resistance. In other words, this formula relationship, which may be geometrically ascertained for a step-up converter in current mode control, allows estimation of the load resistance, and thus also of the load current through the load resistor.

The method also preferably includes the steps of measuring at least one output variable of the digital controller, and using this at least one measured output variable in the step of estimating the instantaneous load resistance value. By use of such an embodiment variant of the method, fluctuations and inaccuracies in the output variable may be eliminated by carrying out an additional measurement of same. Measuring at least one, some, or all output variables stated in the formula relationship thus allows a more accurate estimation of the load resistance value.

The at least one output variable that is measured and used is preferably the value of the output voltage of the control loop or of the path, the controller output value of the controller, the value of the voltage of the compensation ramp of the step-up converter from peak to peak, the duty cycle of the controller, the value of the input voltage of the controller, and/or the period duration of the controller. The output variables measured and used thus preferably include the value of the output voltage of the control loop or of the path, the controller output value of the controller, the value of the voltage of the compensation ramp of the step-up converter from peak to peak, the duty cycle of the controller, the value of the input voltage of the controller, and/or the period duration of the controller. In such a design, within the scope of the method a very accurate estimation of the load resistance, and accordingly, a very reliable adaptation, setting, or readjustment of the transition frequency of the control loop of the step-up converter, take place.

The duty cycle is particularly preferably measured and used in the formula relationship. The duty cycle may be measured and used without loss in the formula relationship. In reality, however, the duty cycle is usually somewhat greater due to losses, which may be taken into account by an additional measurement of same. In addition, the input voltage of the controller is preferably measured and used in the formula relationship for the purpose of estimation.

The magnitude of the transition frequency at any time is preferably less than the magnitude of the frequency that is associatable with the zero point of the transmission function of the control loop in the right-half plane of a pole-zero point diagram. In addition, the magnitude of the transition frequency at any time is preferably considerably or significantly less than the magnitude of the frequency that is associatable with the zero point of the transmission function of the control loop in the right-half plane of a pole-zero point diagram. Furthermore, the transition frequency at any time is preferably below the zero point of the transmission function of the control loop in the right-half plane of a pole-zero point diagram. Meeting this condition ensures that the control loop, and thus the step-up converter, is securely and stably operable at all times.

In addition, a control loop for a step-up converter is preferably provided with a digital controller that is configured to carry out the steps of the method according to the present invention. The advantages of the method mentioned above apply here within the scope of operation of the control loop.

Also provided is a computer program product that includes computer-executable program code for carrying out the method according to the present invention when the program is run on a device. The advantages of the method mentioned above apply here within the scope of running the program on a device.

Advantageous refinements of the present invention are described herein.

BRIEF DESCRIPTION OF THE DRAWINGS

Exemplary embodiments of the present invention are explained in greater detail with reference to the drawings in the description below.

DETAILED DESCRIPTION OF EXAMPLE EMBODIMENTS

Figure 3:
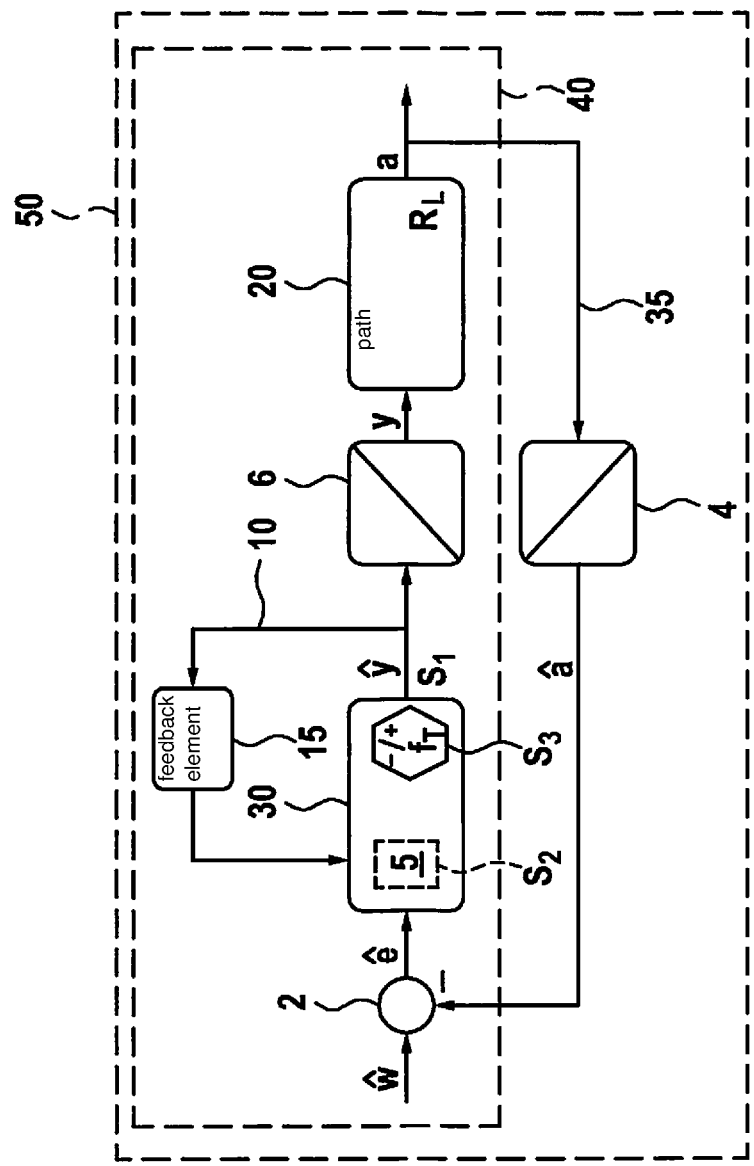
FIG. 3 shows the block diagram of one exemplary embodiment of a control loop according to the present invention for a step-up converter that includes a digital controller, during operation of which one exemplary embodiment of a method according to the present invention is used.

FIG. 3 shows the block diagram of one exemplary embodiment of a control loop 50 according to the present invention for a step-up converter that includes a digital controller 30, during operation of which one exemplary embodiment of a method according to the present invention is used. Control loop 50 includes a controlled system 40 and a return line 35. A digital controller 30 with a dedicated controller feedback loop 10 is situated within controlled system 40 of this exemplary embodiment of a control loop 50 according to the present invention. Controller feedback loop 10 includes a dedicated feedback element 15 within controller feedback loop 10. The step-up converter together with load resistance $R_L$ that is fed by same and the components of the step-up converter are taken into account via path 20 within controlled system 40 in control loop 50 illustrated in FIG. 3. In controlled system 40, control loop 50 also includes a digital-analog converter 6 which converts digital output variables ŷ of controller 30 for the step-up converter into analog output variables y. In addition, an analog-digital converter 4 is provided in return line 35 of control loop 50, with the aid of which analog control variables a (the output voltage at the output of the step-up converter) are tapped at the output of path 20 and converted into digital control variables â for the purpose of feedback. In a subtractor 2 of control loop 50, digital setpoint values ŵ that are fed from the outside into control loop 50 are combined with digital control variables â, previously converted from analog to digital, to form digital control deviations ê=ŵ−â. These digital control deviations ê represent the input variables for digital controller 30, which needs these for providing digital output variables ŷ for the step-up converter, for example for providing output voltage $U_{out}$, or duty cycle D of the step-up converter. Undesirable deviations in digital output variables ȳ of digital controller 30 are corrected via controller feedback loop 10, using feedback element 15. Digital output variables ŷ are converted into analog output variables y with the aid of digital-analog converter 6 in controlled system 40, and supplied to path 20, in particular to the step-up converter.

Within the scope of this exemplary embodiment of a method according to the present invention, in first method step S1 of the method, strictly by way of example the value of output voltage $U_{out}$ of control loop 50 or of path 20, controller output value ControllerOut of controller 30, the value of voltage $U_{comp,ss}$ of the compensation ramp of the step-up converter from peak to peak, duty cycle D of controller 30, and period duration $T_{SW}$ of controller 30 during operation of the step-up converter are evaluated. Thus, these output variables of controller 30 are not measured in control loop 50, but instead are digitally read out. However, other methods according to the present invention may also be carried out in which fewer, more, or also different output variables of controller 30 or of control loop 50 are evaluated within the scope of a first method step during operation of the step-up converter, for example solely output voltage $U_{out}$ of control loop 50 or of path 20, or solely controller output value ControllerOut, or also completely different output values of controller 30. Methods according to the present invention may also be carried out in which many more output variables than those listed above are evaluated. In such methods, within the scope of the estimation, with regard to the unevaluated output variables, use may then be made of output values that are stored in any manner, or also measured. In this exemplary embodiment of the method, the value of a shunt resistance $R_{shunt}$ for measuring the coil current, the value of voltage $U_{comp,ss}$ of the compensation ramp of the step-up converter from peak to peak, the duty cycle, the switching frequency, the output voltage of the control loop or path, and the value of inductance L of the step-up converter are digitally stored.

Instantaneous load resistance value $R_L$ in path 20 of control loop 50 is estimated in second method step S2 of this exemplary embodiment, based on the evaluated output variables. In this exemplary embodiment of the method, the estimation takes place, strictly by way of example, according to the following formula relationship:

$$R_L = \frac{U_{out}}{(1-D) * \left( \frac{ControllerOut - U_{comp,ss} * D}{R_{shunt}} - \frac{U_{out} * (1-D) * D * T_{sw}}{2*L} \right)}$$

where $R_L$ is the value of the load resistance in the path, $U_{out}$ is the value of the output voltage of control loop 50 or of path 20, ControllerOut is the controller output value of the controller, $U_{comp,ss}$ is the value of the voltage of the compensation ramp of the step-up converter from peak to peak, D is the duty cycle of the controller, $R_{shunt}$ is the value of a shunt resistance for measuring the coil current of the step-up converter, L is the value of the inductance of the step-up converter, and $T_{SW}$ is the period duration of the controller. However, in other exemplary embodiments of methods according to the present invention, the estimation may also take place corresponding to some other formula relationship that differs from the formula relationship that is used for the estimation in the present exemplary embodiment. The geometric derivation of this formula relationship is discussed in the description for FIG. 4.

The estimation in second method step S2 may be made, strictly by way of example, by a digital processing unit or some other logic unit. In addition, the estimation may be made outside control loop 50. In this exemplary embodiment, strictly by way of example the estimation is made by a digital processing unit 5, which is provided within digital controller 30 and schematically illustrated in FIG. 3.

Various controller coefficients of digital controller 30 are set in third method step S3 of the method, based on estimated instantaneous load resistance value $R_L$ during operation of the step-up converter, a change in the setting of the at least one controller coefficient resulting in a change in transition frequency $f_T$ in control loop 30. In other words, in third method step S3 of this exemplary embodiment, various controller coefficients of controller 30 are readjusted or adapted, based on estimated load resistance value $R_L$, in such a way that transition frequency $f_T$ in control loop 30 is adapted to the change in the position of the right-half plane zero point when such a change is present. For the sake of clarity, in the block diagram in FIG. 3 the setting of the controller coefficients acting on transition frequency $f_T$ is schematically depicted by a −/+ symbol on the block of digital controller 30. This is used solely for better understanding. In this exemplary embodiment, within the scope of the method the setting of the controller coefficients takes place within control loop 50, in which with the aid of third method step S3 fewer, more, and/or also different controller coefficients of controller 30 may be set, adapted, or readjusted as the result of a load resistance estimation.

Thus, strictly by way of example, in this exemplary embodiment the setting of the controller coefficients in third method step S3 results in an increase in transition frequency $f_T$ when load resistance value $R_L$, estimated in step S2 of estimating, is greater than a load resistance value $R_L$ previously estimated or initially taken into account. In the same way, the setting of the controller coefficients in third method step S3 results in a decrease in transition frequency $f_T$ when estimated load resistance value $R_L$ is less than a load resistance value $R_L$ previously estimated or initially taken into account. Transition frequency $f_T$ of the control loop is thus always adapted to the position of the right-half plane zero point in the pole-zero point diagram via a setting or adaptation of the controller coefficients. For the sake of clarity, it is noted that within the scope of this exemplary embodiment, no setting, adaptation, or readjustment of the controller coefficients takes place when load resistance value $R_L$ estimated in method step S2 remains unchanged with respect to a load resistance value $R_L$ previously estimated or initially taken into account. In this exemplary embodiment, the controller coefficients, strictly by way of example, are likewise set by digital processing unit 5. However, other exemplary embodiments may also be implemented in which the setting of other units or means takes place, or takes place in some other way.

In this exemplary embodiment, as discussed above no measurement of output variables of controller 30 takes place. However, methods according to the present invention may also be carried out in which individual output variables of controller 30 are measured, for example in addition to or as an alternative to their evaluation. As the result of such an additional measurement of output variables, the fluctuations indicated by same may be eliminated and the estimation of load resistance value $R_L$ may be improved.

Figure 1:
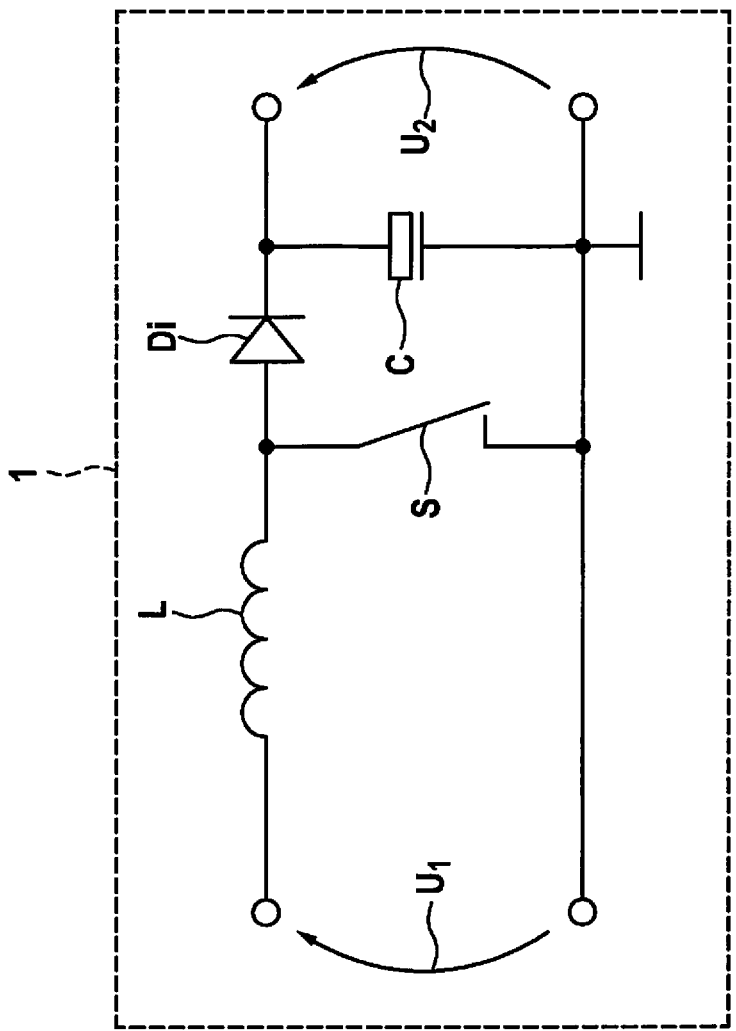
FIG. 1 shows a step-up converter from the related art.
Figure 2:
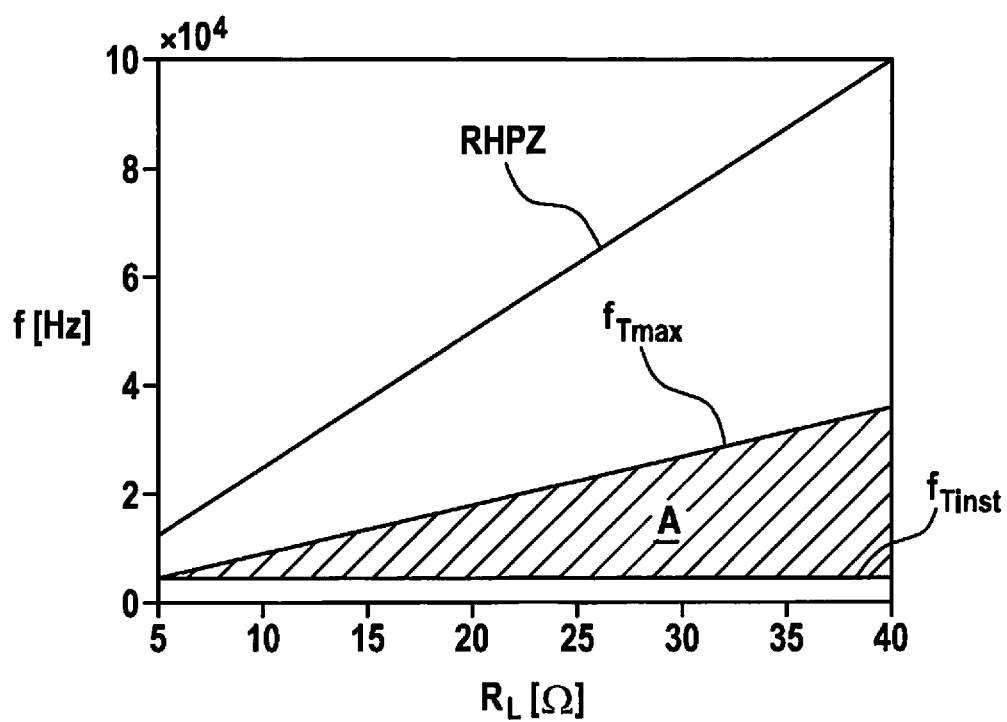
FIG. 2 shows a diagram plotting the frequency that is associatable in each case with a particular right-half plane zero point RHPZ at a given load resistance $R_L$ in the control loop, and various transition frequencies $f_{Tmax}$, $f_{Tinst}$ of the control loop of a step-up converter, in Hertz, as a function of load resistance $R_L$ of the path of the control loop, in ohms.
Figure 4:
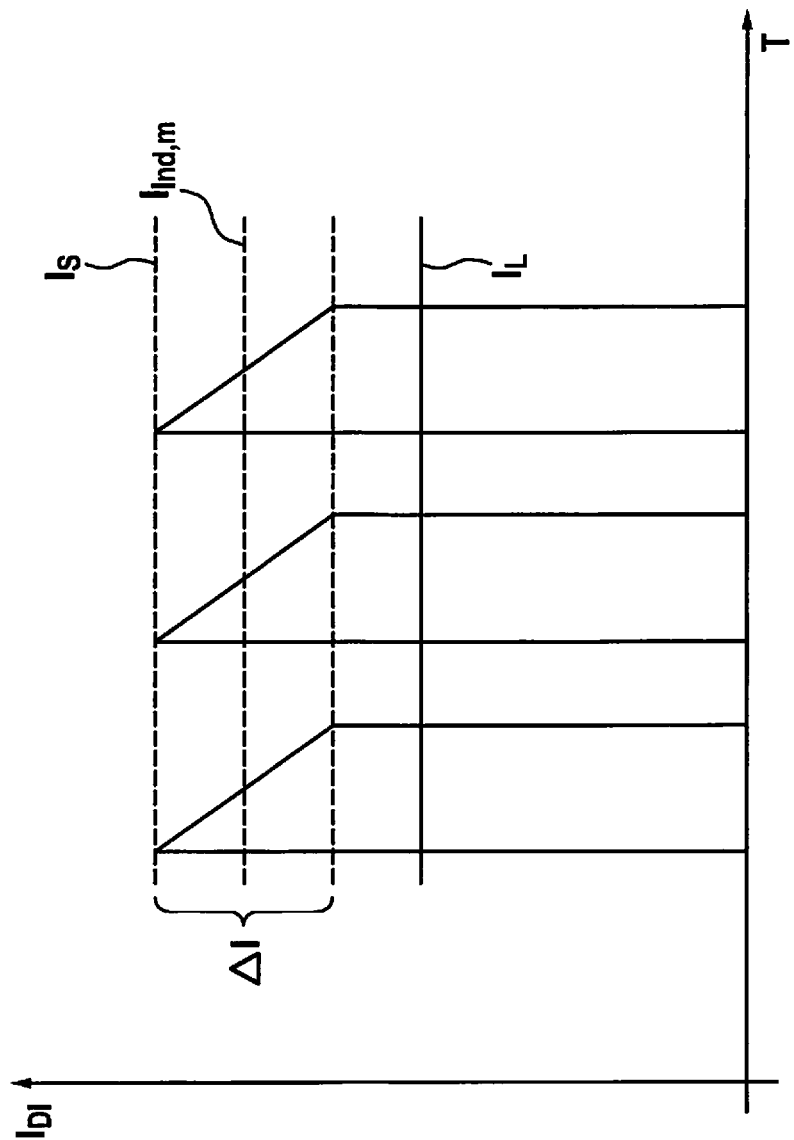
FIG. 4 shows a diagram illustrating the current flow through the diode of a step-up converter during operation, plotted as a function of time, on the basis of which the formula relationship for estimating the load resistance value may be geometrically derived.

FIG. 4 shows a diagram depicting current flow $I_{Di}$ through diode Di of a step-up converter 1 as illustrated in FIG. 1 during operation, as a function of time T, on the basis of which the formula relationship for estimating load resistance value $R_L$ may be geometrically derived. In particular, FIG. 4 illustrates current $I_{Di}$ flowing through diode Di, shown in FIG. 1, in the closed and open states of switch S, likewise shown in FIG. 1. The current flowing through diode Di in the closed state of switch S is 0 A. The current flowing through diode Di in the open state of switch S drops linearly as a function of time in a ramp-like manner for each opening cycle due to the current-voltage characteristic of the inductance. Reference character ΔI denotes the difference between peak current $I_S$ through diode Di and the smallest current flowing through diode Di. Average coil current $I_{ind,m}$ through inductor L of the step-up converter (see FIG. 1) then results according to $I_{ind,m}=I_S-(\Delta I)/2$. The following expression applies for load current $I_L$ which flows through load resistor $R_L$ fed with the aid of the step-up converter:

$I_L=(1-D)\cdot I_{ind,m}$, where D corresponds to the duty cycle of controller 30.

The following applies for ΔI:

$$\Delta I = \frac{U_{in}DT_{SW}}{L}$$

where $U_{in}$ is the value of the input voltage of path 30, L is the value of the inductance of the step-up converter, and $T_{SW}$ is the period duration of controller 30. The following may then be derived for peak current $I_S$:

$$I_s = \frac{ControllerOut - U_{comp,ss} * D}{R_{shunt}}$$

where ControllerOut is the controller output value of controller 30, $U_{comp,ss}$ is the value of the voltage of the compensation ramp of the step-up converter from peak to peak (see FIG. 4), and $R_{shunt}$ is the value of a shunt resistance for measuring the coil current of the step-up converter (not illustrated). Load current $I_L$ then results from the equation:

$$I_L = (1-D)*\left(\frac{ControllerOut - U_{comp,ss} * D}{R_{shunt}} - \frac{U_{out}*(1-D)*D*T_{sw}}{2*L}\right)$$

where $U_{out}$ is the output voltage of control loop 50 or of path 20. This expression, inserted into Ohm's Law, results in the sought formula relationship for estimating load resistance $R_L$:

$$R_L = \frac{U_{out}}{(1-D)*\left(\frac{ControllerOut - U_{comp,ss} * D}{R_{shunt}} - \frac{U_{out}*(1-D)*D*T_{sw}}{2*L}\right)}$$

Figure 5:
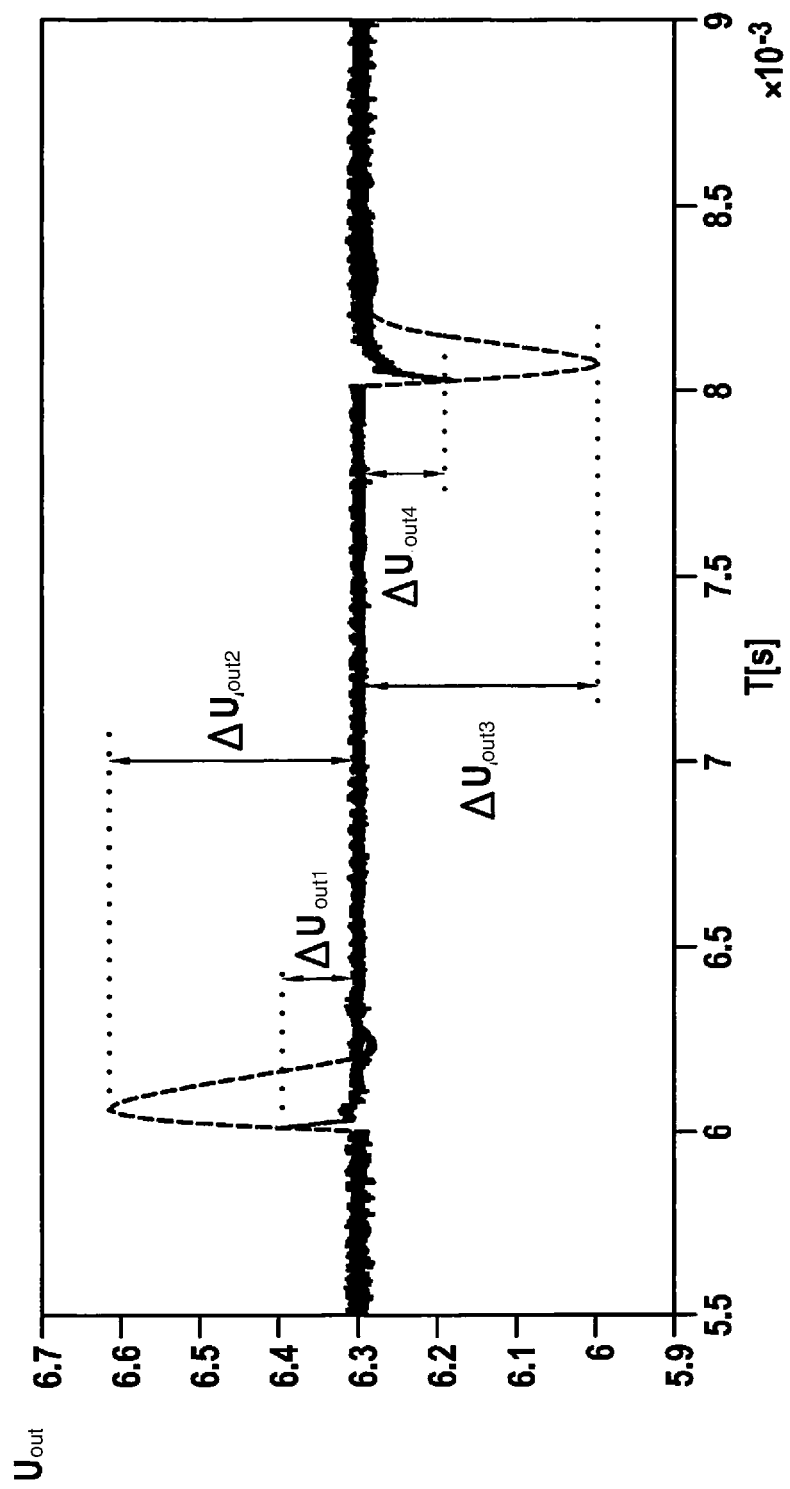
FIG. 5 shows a performance comparison between a digital controller that is provided in a control loop for a step-up converter and operated while carrying out one exemplary embodiment of a method according to the present invention, and a controller that is operated according to a method of the related art.

FIG. 5 shows a performance comparison between a digital controller 30, provided in a control loop 50 for a step-up converter and operated while carrying out one exemplary embodiment of a method according to the present invention, and a controller that is operated according to a method of the related art in a control loop of the related art for a step-up converter. In particular, FIG. 5 shows a diagram in which output voltages $U_{out}$ of both comparative control loops are plotted as a function of time, in seconds. The output voltage curve of control loop 50 operated according to the present invention is illustrated by a solid line, while the output voltage curve of the control loop operated according to the method of the related art is illustrated by a dashed line. The magnitudes of voltage jumps $\Delta U_{out}$, i.e., of the output voltage peaks, or the magnitudes of the amplitudes of the output voltages of the comparative control loops during a change in the load situation in the control loop, are illustrated by double arrows in FIG. 5.

It is clearly apparent in FIG. 5 that voltage jumps $\Delta U_{out}$ in output voltage $U_{out}$ that result due to changes in the load situation in control loops with controllers 30 operated according to the method according to the present invention are much lower than for controllers operated according to methods of the related art. This is attributed to the fact that the method according to the present invention greatly shortens the response times of the controller in the control loop. The controllers operated according to the method according to the present invention may thus respond more quickly to fluctuations in load resistance value $R_L$ in path 20 of control loop 50. In the present case, measured voltage jumps $\Delta U_{out}$ in the output voltage curves illustrated in FIG. 5 are, strictly by way of example, $\Delta U_{out1}$=0.1 V; $\Delta U_{out2}$=0.31 V; $\Delta U_{out3}$=0.3 V; and $\Delta U_{out4}$=0.1 V.

Based on the measurement of output voltage $U_{out}$ for load resistance jumps, it may also be shown that one exemplary embodiment of a method according to the present invention is applied. Voltage drops $\Delta U_{out}$ are an approximate function of $\Delta I_L$ (and thus, of the particular underlying changes in load resistance $\Delta R_L$), output capacitance C (see FIG. 1), and the particular transition frequency $f_T$ of the control loop.

The relationship $\Delta U_{out}=(\Delta I_L)/(C\cdot 2\pi f_T)$ applies in general.

For current jumps having the same $\Delta I_L$ and various absolute values, for example in a comparison of load current jumps $\Delta I_L$ from 1 A to 1.2 A and load current jumps $\Delta I_L$ from 0.3 A to 0.5 A, changed transition frequency $f_T$ is therefore apparent via different magnitudes of voltage drops $\Delta U_{out}$. In addition, in measurements of the frequency response of the open loop of the control loop at various load resistances $R_L$, it is seen that transition frequency $f_T$ of the control loop varies, and an adaptive mechanism is thus provided.

Although the present invention has been illustrated and described in detail using preferred exemplary embodiments, the present invention is not limited by the examples provided, and other variations may be derived therefrom without departing from the scope of the present invention.

What is claimed is:

1. A method for optimizing operation of a digital controller provided in a control loop for a step-up converter, comprising:

evaluating at least one output variable of the digital controller during operation of the step-up converter;

estimating an instantaneous load resistance value in a path of the control loop based on the at least one evaluated output variable;

setting at least one controller coefficient of the digital controller based on the estimated instantaneous load resistance value during operation of the step-up converter;

wherein a change in the setting of the at least one controller coefficient results in a change in a transition frequency in the control loop, wherein the following formula relationship for estimating the load resistance value is used in the step of estimating:

$$R_L = \frac{U_{out}}{(1-D)*\left(\frac{ControllerOut - U_{comp,ss}*D}{R_{shunt}} - \frac{U_{out}*(1-D)*D*T_{sw}}{2*L}\right)}$$

wherein $R_L$ is a value of a load resistance in the path, $U_{out}$ is a value of the output voltage of the control loop or of the path, ControllerOut is a controller output value of the controller, $U_{comp,ss}$ is a value of the voltage of a compensation ramp of the step-up converter from peak to peak, D is a duty cycle of the controller, $R_{shunt}$ is a value of a shunt resistance for measuring the coil current of the step-up converter, L is a value of an inductance of the step-up converter, and $T_{SW}$ is a period duration of the controller.

2. The method as recited in claim 1, wherein setting the at least one controller coefficient results in an increase in the transition frequency when the load resistance value, estimated in the step of estimating, is greater than a load resistance value previously estimated or initially taken into account.

3. The method as recited in claim 1, wherein setting the at least one controller coefficient results in a decrease in the transition frequency when the estimated load resistance value is less than a load resistance value one of previously estimated, or initially taken into account.

4. The method as recited in claim 1, wherein one of: (i) the output voltage of one of the control loop or of the path, (ii) the controller output value, (iii) a duty cycle of the controller, (iv) a period duration of the controller, and/or (v) a voltage of a compensation ramp of the step-up converter from peak to peak, is evaluated in the step of evaluating at least one output variable.

5. The method as recited in claim 1, further comprising: measuring at least one output variable of the digital controller, and using the at least one measured output variable in the step of estimating the instantaneous load resistance value.

6. The method as recited in claim 1, wherein a magnitude of the transition frequency at any time is less than a magnitude of a frequency that is associatable with a zero point of a transmission function of the control loop in a right-half plane of a pole-zero point diagram.

7. The method as recited in claim 5, wherein the at least one output variable that is measured and used is: (i) a value of an output voltage of the control loop or of the path, (ii) a controller output value of the controller, (iii) a value of the voltage of a compensation ramp of the step-up converter from peak to peak, (iv) a duty cycle of the controller, (v) a value of an input voltage of the controller, and/or (vi) a period duration of the controller.

8. A control loop for a step-up converter, including a digital controller that is configured to:
evaluate at least one output variable of the digital controller during operation of the step-up converter;

estimate an instantaneous load resistance value in a path of the control loop based on the at least one evaluated output variable;

set at least one controller coefficient of the digital controller based on the estimated instantaneous load resistance value during operation of the step-up converter;

wherein a change in the setting of the at least one controller coefficient results in a change in a transition frequency in the control loop, wherein the following formula relationship for estimating the load resistance value is used in the step of estimating:

$$R_L = \frac{U_{out}}{(1-D)*\left(\frac{ControllerOut - U_{comp,ss}*D}{R_{shunt}} - \frac{U_{out}*(1-D)*D*T_{sw}}{2*L}\right)}$$

wherein $R_L$ is a value of a load resistance in the path, $U_{out}$ is a value of the output voltage of the control loop or of the path, ControllerOut is a controller output value of the controller, $U_{comp,ss}$ is a value of the voltage of a compensation ramp of the step-up converter from peak to peak, D is a duty cycle of the controller, $R_{shunt}$ is a value of a shunt resistance for measuring the coil current of the step-up converter, L is a value of an inductance of the step-up converter, and $T_{SW}$ is a period duration of the controller.

9. A non-transitory computer-readable storage medium on which is stored a computer program product that includes computer-executable program code for optimizing operation of a digital controller provided in a control loop for a step-up converter, the program code, when executed on a device, causes the device to perform:

evaluating at least one output variable of the digital controller during operation of the step-up converter;

estimating an instantaneous load resistance value in a path of the control loop based on the at least one evaluated output variable;

setting at least one controller coefficient of the digital controller based on the estimated instantaneous load resistance value during operation of the step-up converter;

wherein a change in the setting of the at least one controller coefficient results in a change in a transition frequency in the control loop, wherein the following formula relationship for estimating the load resistance value is used in the step of estimating:

$$R_L = \frac{U_{out}}{(1-D)*\left(\frac{ControllerOut - U_{comp,ss}*D}{R_{shunt}} - \frac{U_{out}*(1-D)*D*T_{sw}}{2*L}\right)}$$

wherein $R_L$ is a value of a load resistance in the path, $U_{out}$ is a value of the output voltage of the control loop or of the path, ControllerOut is a controller output value of the controller, $U_{comp,ss}$ is a value of the voltage of a compensation ramp of the step-up converter from peak to peak, D is a duty cycle of the controller, $R_{shunt}$ is a value of a shunt resistance for measuring the coil current of the step-up converter, L is a value of an inductance of the step-up converter, and $T_{SW}$ is a period duration of the controller.

* * * * *